United States Patent [19]

Ryan

[11] 4,413,795
[45] Nov. 8, 1983

[54] FLUIDIC THRUSTER CONTROL AND METHOD

[75] Inventor: William F. Ryan, Phoenix, Ariz.

[73] Assignee: The Garrett Corporation, Los Angeles, Calif.

[21] Appl. No.: 184,604

[22] Filed: Sep. 5, 1980

[51] Int. Cl.³ ............................................. F42B 15/02
[52] U.S. Cl. .................................. 244/3.22; 137/809; 137/819
[58] Field of Search .......................... 244/3.21, 3.22; 137/809, 819, 831

[56] References Cited

U.S. PATENT DOCUMENTS

| Re. 27,712 | 7/1973 | Becker et al. |
|---|---|---|
| 3,135,291 | 6/1964 | Kepler et al. |
| 3,212,515 | 10/1965 | Zisfein et al. |
| 3,239,150 | 3/1966 | Chisel |
| 3,276,473 | 10/1966 | Lewis et al. |
| 3,486,517 | 12/1969 | Caupa |
| 3,508,579 | 4/1970 | Jones |
| 3,521,654 | 7/1970 | Brautaset et al. |
| 3,606,901 | 9/1971 | Thompson |
| 3,612,442 | 10/1971 | Chisel ................................ 244/3.22 |
| 3,638,671 | 2/1972 | Harvey ................................ 137/831 |
| 3,660,981 | 5/1972 | Stevens |
| 3,704,832 | 12/1972 | Fix et al. |
| 3,717,164 | 2/1973 | Griffin ................................ 137/819 |
| 3,752,172 | 8/1973 | Cohen et al. |
| 3,797,527 | 3/1974 | Bain |
| 3,906,979 | 9/1975 | Chapin ................................ 137/831 |
| 4,077,572 | 3/1978 | Fitzgerald |

OTHER PUBLICATIONS

"Fluidic Valve for Warm Gas Flow Control", J. T. Kaaselmann, et al, AIAA Paper No. 69-118, Jan. 1969.
"The Vortex Valve Controlled Rocket Motor", C. Nelson, et al, AIAA Paper No. 68-538, Jun. 1968.
"Vortex Valves for Thrust Vector and Jet Interaction Control", Rolf K. Broaderson, et al Guidance and Control.
"A Solid-Propellant Rocket Motor Modulated by a Fluidic Bortex Valve", R. F. Walsh, et al., *J. Spacecraft*, vol. 8, No. 1, Jan. 1971, pp. 77-79.
"A Vortex Valve for Flow Modulation of 5500° F. Gas", A. Blatter, et al, *J. Spacecraft*, vol. 7, No. 2, Feb. 1970, pp. 169-174.

*Primary Examiner*—Harold J. Tudor
*Attorney, Agent, or Firm*—James W. McFarland; Leslie S. Miller; Albert J. Miller

[57] ABSTRACT

A fluidic thruster control system and method for guided missiles and the like, which utilizes a fluidic jet interaction device for controlling a downstream fluidic vortex amplifier to modulate exhaust flow through thrust nozzles.

17 Claims, 5 Drawing Figures

FLUIDIC THRUSTER CONTROL AND METHOD

BACKGROUND OF THE INVENTION

This invention relates to thruster control systems for guided missiles and the like, and relates more particularly to an improved fluidic control system therefor.

The advantages in utilizing fluidic vortex valves for controlling propellant hot gas delivered to thruster nozzles has been recognized for some time. For example, prior art systems have contemplated utilization of two vortex valves in series, with the first controlling operation of the second, to modulate propellant gas flow. Also, it has been known to utilize torque motors or the like to control the operation of the vortex valves.

While utilization of such vortex valves provides a variety of advantages for thruster control systems, a serious drawback to their use is the inherent high gain characteristic of such vortex valves which produces difficult control problems for precisely and accurately modulating fluid flows therethrough.

SUMMARY OF THE INVENTION

Accordingly, it is the primary object of the present invention to provide an improved fluidic control system and method for use with thrust vector controls which are incorporated in guided missiles and the like.

A more particular object is to provide such a fluidic control system and method providing improved controllability of the mass fluid flow exiting the thruster vectors while still maintaining the advantageous use of fluidic control devices.

In summary, the invention contemplates utilization of vortex valves for modulating fluid flow through a pair of opposed thrust vector nozzles. The vortex valves are arranged in push-pull arrangement such that the total flow exiting the two opposed nozzles remain substantially constant. To adjust the relative rates of flow through the two valves and the associated thruster control nozzles, the present invention contemplates utilization of a jet interaction fluidic arrangement for generating control signals to modulate operation of the respective vortex valves. The jet interaction type element characteristically has a relatively low gain so that it may be precisely and easily controlled for accurate thruster control. Yet the present invention contemplates utilization of such jet interaction devices to control the vortex valves in such a manner that the jet interaction devices operate continuously only at subsonic conditions. Subsonic conditions are maintained by utilizing the propellant gas as the source of fluid flow for the jet interaction devices, and by venting these devices back into the hot propellant gas flow in a manner providing a controlled, limited pressure ratio across the devices. In this manner, the present invention provides precise, improved, stable fluidic control operation of the propellant flow delivered to the opposed thrust vector nozzles, and also presents a closed system wherein all of the propellant gas is exhausted only through the thruster nozzles. The system of the present invention is capable of being directly responsive to electrical input command signals. Furthermore, the present invention provides an extremely compact, reliable arrangement that is sufficiently small so that it may even be used for controlling the terminal portion of the flight of small missiles such as mortar shells.

These and other objects and advantages of the present invention are specifically set forth in or will become apparent from the following detailed description of the preferred form of the invention when read in conjunction with the accompanying drawings.

DETAILED DESCRIPTION OF THE PREFERRED EMBODIMENT

Figure 1:
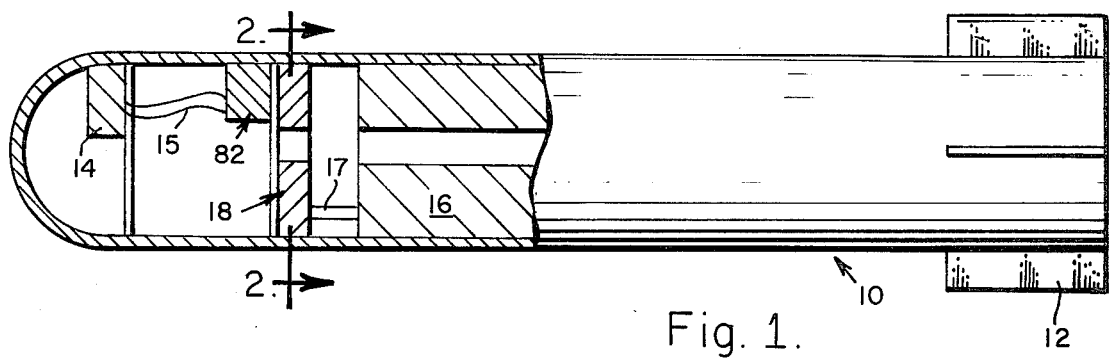
FIG. 1 is an elevational view, with portions broken away to reveal internal details of construction, of a guided missile such as a mortar shell which utilizes the present invention.
Figure 2:
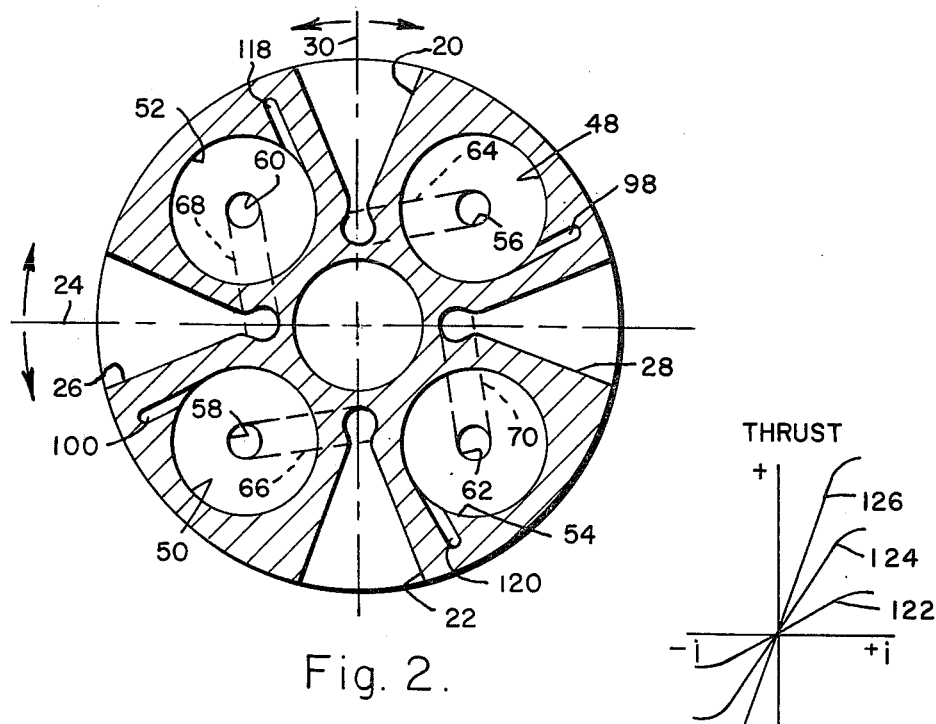
FIG. 2 is a plan cross-sectional view taken along lines 2—2 of FIG. 1.
Figure 3:
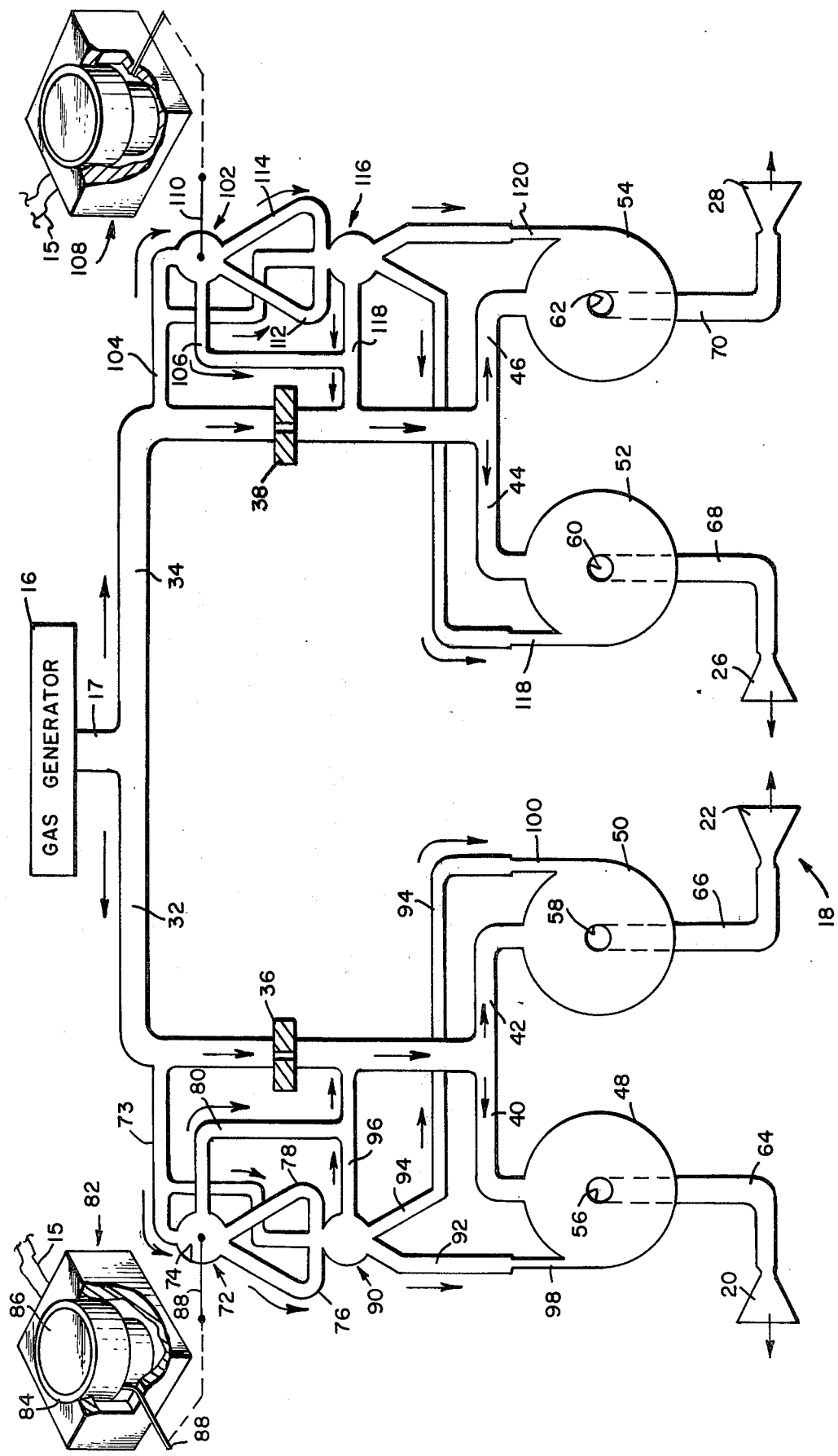
FIG. 3 is a schematic representation of the fluidic control system as contemplated by the present invention.

Referring now to FIGS. 1-3, a typical guided missile such as a mortar shell 10 generally includes an afterbody having a plurality of stabilizer fins 12, and a seeker control 14 generating an electronical signals via lines 15. Further, the guided missile includes an internal gas generator 16 which delivers hot propellant gas through a passage 17 to a thrust vector guidance control system generally denoted by the numeral 18. As best depicted in FIG. 2, the missile includes a pair of opposed thrust exhaust nozzles 20, 22 which are effective to adjust the attitude of the missile about axis 24 due to differential propellant gas flow through the nozzles 20, 22. Similarly, the missile also includes opposed nozzles 26, 28 which are operable to adjust the attitude of the missile about axis 30.

Referring to FIGS. 2 and 3, propellant gas flow from passage 17 is split in parallel flow arrangement between a pair of passages 32, 34, to serially flow through flow restrictors 36, 38, to again be respectively divided into passages 40, 42, 44, 46 which end as supply ports to fluidic vortex valves 48, 50, 52, and 54. The respective central exhaust ports 56, 58, 60, and 62 of these vortex valves are connected through ducts 64, 66, 68, and 70 to the respective thrust nozzles 20, 22, 26 and 28.

Referring now only to the left hand side of FIG. 3, the guidance control system associated with adjusting the attitude of the missile about axis 24 will be described. This guidance control system includes a fluidic, jet interaction type, proportional fluidic device 72 which includes an input port receiving as a source of fluid through input passage 73, the pressurized motive gas propellant flow from passage 32 at a location upstream of flow restrictor 36. Jet interaction device 72 includes an interaction region 74, a pair of output ports 76, 78, and a vent port 80 all communicating with the interaction region 74. The vent port 80 is interconnected back into passage 32 at a location downstream of flow restrictor 36 via passage 96.

As will be apparent from FIGS. 1 and 2, this entire fluidic control is extremely compact and can be made in laminate form to incorporate the thrust vectors, all in a very small, disk-like package easily incorporated into small environments.

Associated with interaction device 72 are control means including a transducer 82 adapted to interact with the fluidic jet issuing from passage 73 for proportionally controlling fluid flow to the pair of output ports 76, 78. The transducer 82, in conjunction with interaction device 72, may be of the type such as the electrofluidic transducer as depicted and described in U.S. Pat. No. 3,638,671 or 3,906,979. For purposes of explanation with respect to the present invention, it is pointed out that the transducer 82 includes a coil 84, and magnetic 86 which are responsive to the electrical control signals form the seeker as transmitted through lines 15 to cause rotation and movement of an output rod or element schematically illustrated at 88 in FIG. 3. In response to the electrical control input signal, the transducer is operable to move the rod 88 transversely across the jet interaction region 74 to variably interact with the jet nozzle flow from passage 73 and thus modulate the relative output flows being received in the output ports 76, 78 from the fluid jet issuing from input passage 73. In this manner, the transducer 82 in conjunction with jet interaction amplifier 72 produces a pneumatic pressure differential signal in output ports 76, 78 which is an amplified, proportional representation of the electrical input signal received in lines 15. To the extent necessary reference may be made to the above identified two patents for more detailed description of an electrofluidic transducer.

In a preferred embodiment of the present invention, for power matching purposes, the guidance control system further includes a jet interaction amplifier 90 similar to the jet interaction device 72 described above. That is, amplifier 90 includes an input port receiving as source fluid the gas flow from passage 32 at a location upstream of flow restrictor 36, a pair of output ports and associated passages 92, 94, and a vent port 96 which is also interconnected back in to the passage 32 at a location downstream of flow restrictor 36. The second jet interaction amplifier 90 is effective to amplify the power of the pneumatic pressure differential signal existing in output port 76, 78 and supplied as input signals to the second amplifier (instead of the rod 88 position input signal to the device 72), and to deliver this amplified pneumatic signal through passages 92, 94 to the respective input control ports 98, 100 associated with the fluidic vortex valves 48 and 50.

The guidance control system shown on the right hand side of FIG. 3, generally duplicative to the guidance control system described immediately above, is effective to proportionally control fluid exhaust flow through nozzles 26, 28 to thereby adjust the attitude of the guided missile about axis 30. More particularly, this second guidance control system also includes a fluid jet interaction type device 102 like device 72, with an input supply port receiving pressurized gas flow from passage 34 at a location upstream of restrictor 38 through passage 104, and with vented fluid from the jet interaction region of device 102 being returned via passage 106 and 118 back to passage 34 at a location downstream of restrictor 38. Also, a second transducer 108, essentially duplicative to the transducer 82 described immediately above, is also included to provide a rod or element 110 that proportionally translates across the jet interaction region to develop a pneumatic differential signal in output ports 112, 114 which is proportional to the electrical control signal received through lines 15. Also, a pure fluid jet amplifier 116 is also included to further amplify the power of this pneumatic differential signal and deliver it to input control ports 118, 120 associated respectively with vortex valves 52 and 54. Again, the interaction region of proportional interaction amplifier 116 is also vented back to passage 34 at a location downstream of restrictor 38 through passage 118.

In operation, the gas generator 16 delivers a very high pressure flow of hot, contaminated propellant gas through passages 17, 32 to the first pair of vortex valves 48, 50 and ultimately to the thrust vector nozzles 20, 22. Overall, the guidance control system is operable, via the pneumatic differential flows into control ports 98, 100, to modulate the relative flows through the opposed nozzles 20, 22. Yet these nozzles are arranged in push-pull relationship so that the sum of the flows through these two nozzles remains substantially constant. Thus, a substantially constant pressure differential across flow restrictor 36 is maintained. Flow restrictor 36 is of a preselected size so as to develop a desired pressure differential thereacross. Since device 72 and amplifier 90 are connected to passage 32 upstream and downstream of restrictor 36, this constant, desired pressure differential is maintained across each. This maintains subsonic conditions in the jet interaction device 72 and amplifier 90. More particularly by maintaining the pressure ratio across these jet interaction elements at 2-to-1 or less, they remain operable in subsonic conditions at all times, even with varying supply pressure as discussed in further detail below. Thus, stability of operation of the jet interaction elements is maintained. At the same time, even though the interaction device 72 and amplifier 90 are utilizing a portion of the propellant gas flow, it is important to note that all gas flow exits only through the thruster nozzles.

In response to electronic control system signals received through lines 15, the transducer 82 is operable in a known manner to develop a pneumatic flow differential signal in output port 76, 78. These become the input flow differential signal into the interaction region of the amplifier 90 for controlling fluid flow proportionally through output ports 92, 94 in relation to the input control signal received by the electrofluidic transducer. The flow differential in passages 92, 94 are directed into tangential input control ports 98, 100 of the pair of vortex valves 48, 50. For example, a greater pneumatic power flow delivered through control port 100 creates a vortex flow within the main chamber of vortex valve 50, creating impedance or restriction to gas fluid flow from input port 42 to exhaust port 58. Accordingly, a greater power signal into control port 100 proportionally reduces the thrust exhaust flow through nozzle 22. In conjunction with delivery of this high power flow into control port 100, a proportionally lower power flow is delivered through control port 98 to the other vortex valve 48. As a result, a less powerful vortex flow is established within vortex valve 48 thereby providing less flow restriction for propellant exhaust through port 56 to thrust nozzle 20. Accordingly, it will be seen by arranging the vortex valves 48, 50 and the associated thruster nozzles in push-pull relationship, a substantially constant total flow through the two vortex valves 20, 22 is maintained. However, in response to the electronic control signals the differential flow between these two thrusters is proportionally controlled in order to proportionally adjust the attitude of the missile about axis 24.

Importantly, the jet interaction devices and amplifiers utilized in the present invention are of relatively low gain so that an accurate, reliable proportional control signal is generated in relation to the electronic input signal. Yet, these relatively low gain devices provide a stable, effective control input for proportionally controlling the operation of the very high gain vortex amplifiers 48, 50.

In this manner, the present invention obviates certain deleterious operational characteristics of prior art arrangements. By utilizing a low gain jet interaction device for the operative control device for modulating the flow through high gain vortex amplifiers, the present invention provides a system with a highly controllable, proportional action. In contrast, the utilization of serially arranged vortex valves, both of which have very high gain, tends to result in unstable and noisy operation. Also, utilization of the jet interaction devices have the attendant advantage that, considering the relative power size needed of these jet interaction devices, they have substantially larger port sizes than the correspondingly required vortex valves if such were used for the operation of the interaction amplifiers of the present invention, thereby substantially reducing the sensitivity of the present system to contamination carried by the hot propellant gas. Furthermore, by utilizing the jet interaction devices in combination with the downstream vortex amplifiers, attendant advantages are realized in comparison to utilization of only jet interaction amplifiers which, because of their relative low gain characteristic in order to maintain subsonic conditions and therein stability of operation, would be of an extremely large size in order to provide the mass flow needed for proper thruster operation.

By venting the jet interaction element 72, 90 back into passage 32 at a location downstream of flow restrictor 36, as mentioned previously, these elements are maintained at subsonic conditions for stability of operation. Furthermore, this avoids the serious problem of vent flow passing down the lower-flow output port of the jet interaction device 72 or amplifier 90 which would occur if the vent port were merely restricted and open to the atmosphere.

It should be apparent to those skilled in the art that the guidance control system associated with the other two pair of vector thrust nozzles 26, 28 operates in the same manner discussed above with regard to the control system associated with nozzles 20, 22. In this respect, while electrical lines 15 into the second transducer 108 are illustrated schematically as being the same as those going into the other transducer 82, it will be apparent to those skilled in the art that the seeker is generating different electrical signals for the two guidance control systems in order to adjust the attitude of the missile respectively about axes 24 and 30.

Figure 4:
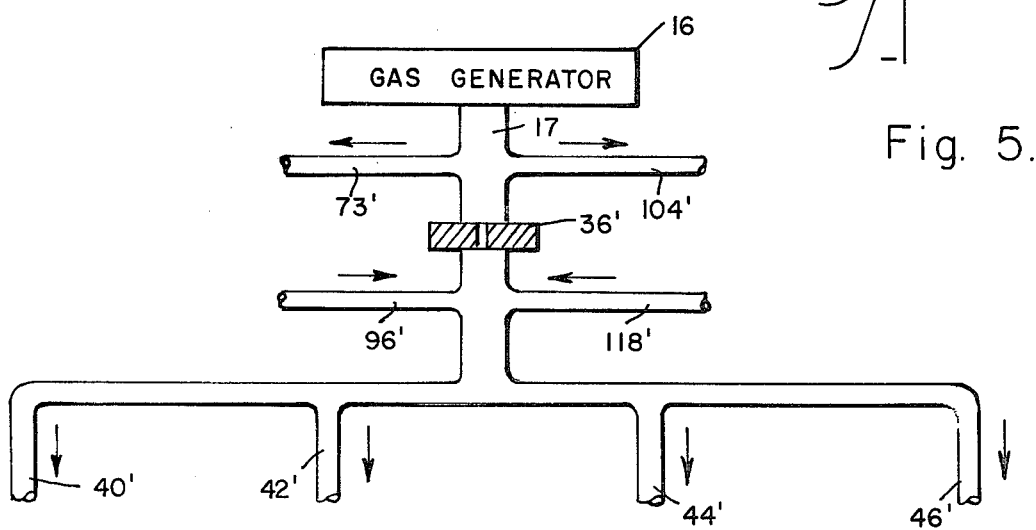
FIG. 4 is a partial schematic of a modified form of the present invention.

FIG. 4 illustrates a modified form of a portion of the present invention. Specifically, from the passage 17 delivering propellant flow from generator 16, there is included a single restrictor 36', and propellant gas flow goes directly to the passages 40', 42', 44', 46' associated with the input ports of the four vortex valves illustrated in FIG. 3. Additionally, a line 37' and 96' respectively deliver and receive gas flow that is utilized by the jet interaction elements 72 and 90. Similarly, lines 104' and 118' deliver and receive propellant gas flow utilized in the jet interaction elements 102 and 116. It will thus be apparent that FIG. 4 embodiment operates in the same manner as discussed above with FIG. 3. However, only a single restrictor 36' is utilized in place of the pair of restrictors 36, 38 and the parallel-arranged passages 32, 34.

Another important aspect of the present invention is that regulation of supply pressure is not required. This is true even though a typical solid or liquid propellant gas generating source may produce a source pressure which varies substantially dependent upon grain size variations and external temperature, pressure conditions, even though the source pressure does remain relatively constant with respect to the response time of the total control system. For example, given external conditions may, during one operation create a 2000 psi source pressure, yet at another time provide a 1500 psi source pressure. Similarly, the source pressure may slowly degrade throughout the length of a mission, though at any given time during the mission the pressure is relatively constant.

Figure 5:
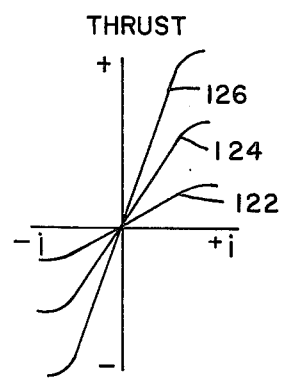
FIG. 5 is a graphical representation of the thrust differential produced across a pair of vector nozzles as a function of input command signal current, for different pressures of source gas being supplied to the system of the present invention.

This is accomplished by the present invention since the pressure ratio across restrictors 36, 38 or 36' remains substantially constant and at subsonic conditions, since the vortex valves remain essentially sonic, and since the total flow therethrough, for a given source pressure, remains substantially constant. This is graphically illustrated in FIG. 5 which illustrates the thrust developed across thrust nozzles 20, 22 as a function of input current, i, to the associated transducer 82. In FIG. 5, three curves 122, 124, 126 are shown, depicting typical operation at drastically different source pressures supplied through passage 17, of 100 psi, 1500 psi and 2000 psi. Obviously, as shown by the varying slope of these curves, different gain characteristics resulting form different supply pressure; however, it is important to note that the system of the present invention does provide proportional control with equivalent operational characteristics. More generally, the present invention can provide the same predictable, reliable, proportional response regardless of whether supply pressure is at 5 psi or 10,000 psi, thus eliminating the need for source pressure regulation to a design pressure requirement.

From the foregoing it will be apparent that the present invention contemplates an improved method of controlling the attitude of a guided missile relative to a given axis thereof by first delivering a generally continuous motive gas flow from the gas generator 16 to the pair of nozzles 20, 22 in parallel flow arrangement so that the differential gas flow therethrough adjusts the attitude of the missile about the given axis. Then, the differential gas flow through nozzles 20, 22 is proportionally controlled by the high gain vortex valves 48, 50 so as to maintain a constant total exhaust flow through the nozzles 20, 22. Operation of the vortex valves in turn are controlled by the proportional fluidic, relatively low gain jet interaction device 72. Lastly, subsonic conditions are maintained in the jet interaction device 72 by impressing across this amplifier the pressure differential which is developed across restrictor 36. Further, the method contemplates the step of transforming the proportional electrical signal received in lines 15 to a fluidic flow differential signal in the jet interaction device.

Various modifications and alterations to the illustrated and described system will be apparent to those skilled in the art. For example, a pneumatic pressure differential control signal input to device 72 could be utilized in place of the proportionally moving pin 88. Accordingly, the foregoing detailed description of the preferred embodiment of the invention should be considered exemplary in nature and not as limiting to the scope and spirit of the invention as set forth in the appended claims.

Having described the invention with sufficient clarity that those skilled in the art may make and use it, I claim:

1. A subsonic fluidic system for controlling flow from a source of warm gas through opposing first and second thrust nozzles arranged whereby the sum of the flows through both of said nozzles remains substantially constant, comprising:

passage means for delivering gas flow from said source to said first and second thrust nozzles in parallel flow arrangement;

a first fluidic vortex valve having a supply port communicating with said passage means, an exhaust port communicating with said first thrust nozzle, and a control port;

a second fluidic vortex valve having a supply port communicating with said passage means, an exhaust port communicating with said second thrust nozzle, and a control port;

a flow restrictor interposed in said passage means upstream of said first and second fluidic vortex valves for producing a pressure differential across said restrictor;

a fluidic jet interaction type proportional device having an input port, a jet interaction region adapted to receive a fluid jet issuing from the input port, first and second output ports and a vent port all communicating with said interaction region, said input port and vent port respectively communicating with said passage means upstream and downstream of said flow restrictor whereby said pressure differential is maintained across said jet interaction proportional device to maintain subsonic conditions therein, said first and second output ports respectively operatively communicating with said control ports of said first and second vortex valves; and control means adapted to interact with said fluid jet and responsive to an input command signal for proportionally controlling flow from said interaction region to said first and second output ports to develop a fluid control signal thereacross proportional to said input command signal.

2. A fluidic system for porportionally controlling warm gas flow through a pair of thrust nozzles, comprising:

passage means for delivering gas flow from a source to said first and second thrust nozzles in parallel flow arrangement;

a pair of fluidic vortex valves each having control ports for receiving proportional fluid signals and being operable to proportionally vary the rates of flow of warm gas through each of said thrust nozzles in relation to said fluid signals whereby the total flow through both of said nozzles remains substantially constant;

a flow restrictor interposed in said passage means upstream of said pair of vortex valves for producing a pressure differential across said flow restrictor;

a fluidic jet interaction device having an input port and vent port respectively communicating with said passage means upstream and downstream of said flow restrictor whereby said pressure differential is impressed across said device to maintain subsonic conditions therein, said device having a pair of output ports operably communicating with said control ports of said pair of vortex valves; and control means for proportionally varying flow from said input port between said pair of output ports to develop said proportional fluid signals therein.

3. A fluidic system for porportionally controlling warm gas flow through a pair of thrust nozzles, comprising:

passage means for delivering gas flow from a source to said first and second thrust nozzles in parallel flow arrangement;

a pair of fluidic vortex valves each having control ports for receiving fluid signals to vary the rates of flow of warm gas through each of said thrust nozzles whereby the total flow through both of said nozzles remains substantially constant;

a flow restrictor interposed in said passage means upstream of said pair of vortex valves for producing a pressure differential across said restrictor;

a fluidic jet interaction device having an input port and vent port respectively communicating with said passage means upstream and downstream of said flow restrictor whereby said pressure differential is impressed across said device to maintain subsonic conditions therein, said device having a pair of output ports respectively communicating with said control ports of said pair of vortex valves; and control means for dividing flow from said input port between said pair of output ports in proportion to input command signals.

4. A thrust vector guidance control system for a guided missile having a seeker for generating a porportional control command signal to adjust the attitude of the missile about an axis thereof, comprising:

a source of warm gas in said missile;

first and second opposing thrust nozzles arranged on said missile whereby differential gas flow through said first and second nozzles adjusts said attitude of the missile about said axis;

passage means for delivering gas flow from said source to said first and second nozzles in parallel flow arrangement whereby the sum of the flows through said first and second nozzles remains substantially constant;

a first fluidic vortex valve having a supply port communicating with said passage means, an exhaust port communicating with said first nozzle, and a control port;

a second fluidic vortex valve having a supply port communicating with said passage means, an exhaust port communicating with said second nozzle, and a control port;

a flow restrictor interposed in said passage means upstream of said first and second fluidic vortex valves for producing a pressure differential across said restrictor;

a fluidic jet interaction device having an input port and a vent port respectively communicating with said passage means upstream and downstream of said flow restrictor whereby said pressure differential is impressed across said device to maintain subsonic conditions therein, said device having a pair of output ports respectively communicating with said control ports of said first and second vortex valves; and control means responsive to said proportional command signal from said seeker for varying flow from said input port to said pair of output ports to generate a proportional fluidic signal thereacross in relation to said proportional command signal.

5. In a guided missile having a source of motive gas and means for generating a control command signal for proportionally adjusting the attitude of said missile about a first axis thereof, a first guidance control system comprising:
- first and second opposing thrust nozzles arranged on said missile whereby differential gas flow through said first and second nozzles adjusts said attitude of the missile about said first axis;
- passage means for delivering gas flow from said source to said first and second nozzles in parallel flow arrangement;
- a first fluidic vortex valve having a supply port communicating with said passage means, an exhaust port communicating with said first nozzle, and a control port;
- a second fluidic vortex valve having a supply port communicating with said passage means, an exhaust port communicating with said second nozzle, and a control port;
- a flow restrictor interposed in said passage means upstream of said first and second fluidic vortex valves for producing a pressure differential across said restrictor;
- a fluidic jet interaction device having an input port and a vent port respectively communicating with said passage means upstream and downstream of said flow restrictor whereby said pressure differential is impressed across said device to maintain subsonic conditions therein, said device having a pair of output ports respectively communicating with said control ports of said first and second vortex valves; and
- control means responsive to said proportional command signal from said seeker for varying flow from said input port to said pair of output ports to generate a proportional fluidic signal thereacross in relation to said proportional command signal.

6. In a guided missile as set forth in claim 5, further including means for generating a second control command signal for proportionally adjusting the attitude of said missile about a second axis thereof, and a second guidance control system comprising:
- third and fourth opposing thrust nozzles arranged on said missile whereby differential gas flow through said third and fourth nozzles adjusts said attitude of the missile about said second axis;
- second passage means for delivering gas flow from said source to said third and fourth nozzles in parallel flow arrangement;
- a third fluidic vortex valve having a supply port communication with said second means, an exhaust port communicating with said third nozzle, and a control port;
- a fourth fluidic vortex valve having a supply port communicating with said second passage means, an exhaust port communicating with said fourth nozzle, and a control port;
- a second flow restrictor interposed in said second passage means upstream of said third and fourth fluidic vortex valves for producing a pressure differential across said second restriction;
- a second fluidic jet interaction device having an input port and a vent port respectively communicating with said second passage means upstream and downstream of said second flow restrictor whereby said pressure differential is impressed across said second fluidic jet interaction device to maintain subsonic conditions therein, said second fluidic jet interaction device having a pair of output ports respectively communicating with said control ports of said third and fourth vortex valves; and
- second control means responsive to said second proportional command signal from said seeker for varying flow from said input port to said pair of output ports of said second fluidic jet interaction device to generate a second proportional fluidic signal there across in relation to said second proportional command signal.

7. A system as set forth in claims 1, 2, 3, 4, and 5, wherein said jet interaction device has a relatively low gain and said vortex valves have relatively high gain.

8. A system as set forth in claim 7, further including a jet interaction amplifier interposed between said jet interaction device and said control ports of the vortex valves, said amplifier having an input port and a vent port respectively communicating with said passage means upstream and downstream of said flow restrictor to maintain subsonic conditions in said amplifier, a pair of input control ports communicating with said output ports of said jet interaction device, and a pair of output ports communicating with said control ports of the vortex valves 9. A system as set forth in claim 7, wherein said control means comprises an electrical transducer operably coupled with said jet interaction device.

10. A system as set forth in claim 9, wherein said transducer comprises a magnet, a coil, and a rod secured to the coil and movable across said interaction region of said device in proportion to said input command signal.

11. A system as set forth in claims 1, 3, 4 or 5, wherein said input command signal is electrical and said control means comprises an electrical transducer responsive to said input command signal to generate said fluid signal across said output ports to the jet interaction device in proportion to said input command signal.

12. A system as set forth in claim 2, further including means for generating an electrical command signal, said control means comprising an electrical transducer responsive to said command signal for developing said fluid signal across said pair of output ports in proportion to said command signal.

13. For a guided missile having a source of warm gas motive flow, and seeker means for generating first and second electrical control signals for proportionally controlling the attitude of the missile about first and second axes thereof, a fluidic control system comprising:
- first and second thrust nozzles arranged in opposing relationship on said missile whereby differential gas flow therethrough adjusts the attitude of the missile about said first axis;
- third and fourth thrust nozzles arranged in opposing relationship on said missile whereby differential gas flow therethrough adjusts the attitude of the missile about said second axis;
- passage means for delivering a substantially continuous flow of motive gas to said first through fourth thrust nozzles in parallel flow arrangement whereby the total flow exhausted through said first through fourth nozzles remains relatively constant;

flow restrictor means interposed in said passage means for developing a preselected pressure differential thereacross;

first and second, relatively low gain, jet interaction, proportional, fluidic devices each having an interaction region and an input port, a vent port, and a pair of output ports all communicating with the associated interaction region, said input and vent ports of said first and second devices communicating with said passage means in parallel to gas flow to said thrust nozzles and at locations respectively upstream and downstream of said restrictor means to maintain subsonic conditions within said first and second devices;

first and second electrical transducers respectively receiving said first and second electrical control signals, and having associated elements extending into said interaction regions of said first and second devices respectively, said first and second transducers operable to develop fluid signals across said pair of output ports of said first and second devices in proportion to said first and second electrical control signals respectively;

first and second, relatively low gain, jet interaction, proportional, fluidic amplifiers each having an interaction region and an input port, a vent port, a pair of control ports and a pair of output ports all communicating with the associated interaction region, said input and vent ports of said first and second amplifiers communicating with said passage means in parallel to gas flow to said thrust nozzles and at locations respectively upstream and downstream of said restrictor means to maintain subsonic conditions within said first and second amplifiers, said pair of control ports of said first and second amplifiers respectively communicating with said pair of output ports of the first and second devices whereby said first and second amplifiers are operable to amplify said proportional fluid signals of said first and second devices;

first and second, relatively high gain, proportional, fluidic vortex valves interposed in said passage means in series flow relationship to said first and second thrust nozzles respectively, said first and second vortex valves having control parts respectively communicating with one and the other of said pair of output ports of said first amplifier whereby differential gas flow through said first and second thrust nozzles is controlled in proportion to said first electrical control signal; and third and fourth, relatively high gain, proportional, fluidic vortex valves interposed in said passage means in series flow relationship to said third and fourth thrust nozzles respectively said third and fourth vortex valves having control ports respectively communicating with one and the other of said pair of output ports of said second amplifier whereby differential gas flow through said third and fourth thrust nozzles is controlled in proportion to said second electrical control signal.

14. A method of controlling the attitude of a guided missile relative to an axis thereof comprising:

delivering a generally continuous motive gas flow from a gas generator in said missile across a restrictor to a pair of opposing thrust nozzles in parallel flow arrangement, the differential gas flow exhausting through said pair of thrust nozzles being effective to adjust the attitude of the missile about said axis;

proportionally controlling said differential gas flow through said pair of thrust nozzles by an associated pair of proportional, fluidic, relatively high gain, vortex valves operable to maintain a substantially constant total exhaust flow through both of said thrust nozzles;

proportionally controlling operation of said vortex valves by a proportional, fluidic, relatively low gain, jet interaction device; and maintaining subsonic operating conditions in said jet interaction device by impressing the pressure differential developed by the restrictor across said jet interaction device.

15. A method as set forth in claim 14, wherein said maintaining step includes communicating the input port and vent port of the jet interaction device with the motive gas flow at locations respectively upstream and downstream of said restrictor.

16. A method of controlling the attitude of a guided missile relative to an axis thereof comprising:

delivering a generally continuous motive gas flow from a gas generator in said missile across a restrictor to a pair of opposing thrust nozzles in parallel flow arrangement, the differential gas flow exhausting through said pair of thrust nozzles being effective to adjust the attitude of the missile about said axis;

proportionally controlling differential gas flow through said pair of thrust nozzles by an associated pair of proportional, fluidic, relatively high gain, vortex valves operable to maintain a substantially constant total exhaust flow through both of said thrust nozzles;

proportionally controlling operation of said vortex valves by a proportional, fluidic, relatively low gain, jet interaction device; and operating the jet interaction device by impressing the pressure differential developed across said restrictor across said jet interaction device to maintain subsonic conditions in said jet interaction device.

17. A method as set forth in claims 14, 15 or 16, further including the step of transforming a proportional electrical command signal to a fluidic flow differential signal in said jet interaction device.

* * * * *